United States Patent [19]

Pasco

[11] 4,323,951
[45] Apr. 6, 1982

[54] LAMINAR LIGHT GUIDE

[75] Inventor: Ian K. Pasco, Bracknell, England

[73] Assignee: Combined Optical Industries Ltd., Slough, England

[21] Appl. No.: 159,659

[22] Filed: Jun. 16, 1980

[30] Foreign Application Priority Data

Nov. 27, 1979 [GB] United Kingdom ............... 40914/79

[51] Int. Cl.³ ............................................. G01D 11/28
[52] U.S. Cl. ........................................ 362/27; 362/26; 362/31; 362/32; 362/268; 362/297; 362/307; 362/308; 362/330; 362/339
[58] Field of Search ....................... 362/27, 26, 31, 32, 362/268, 297, 307, 308, 330, 339

[56] References Cited

U.S. PATENT DOCUMENTS 4,233,927  11/1980  Oikawa ................................. 362/26

*Primary Examiner*—Stephen J. Lechert, Jr.

*Attorney, Agent, or Firm*—Laubscher, Philpitt & Laubscher

[57] ABSTRACT

The present invention relates to laminar light guides which are particularly suitable for providing illumination from one or more light sources to a plurality of instruments and other display devices as in a vehicle instrument panel. The guide makes efficient use of the light available from the light sources. The guide comprises a transparent lamina (1,2,3) having at least one integrally formed light input socket (4) for receiving a light source (14). The socket (4) is formed with lens means (13) and reflecting means (15) for directing light from the source into the plane of the lamina where it is internally reflected until encountering extracting means including roughened surfaces (6,7,8,9) for reflecting light diffusely out of the plane of the lamina or conical apertures (5) for reflecting light into a beam transverse to the plane of the lamina. The light is extracted to illuminate display characters (16) or areas in an otherwise opaque screen (17), or to direct light into pointers of instruments, for example clocks, speedometers etc.

9 Claims, 4 Drawing Figures

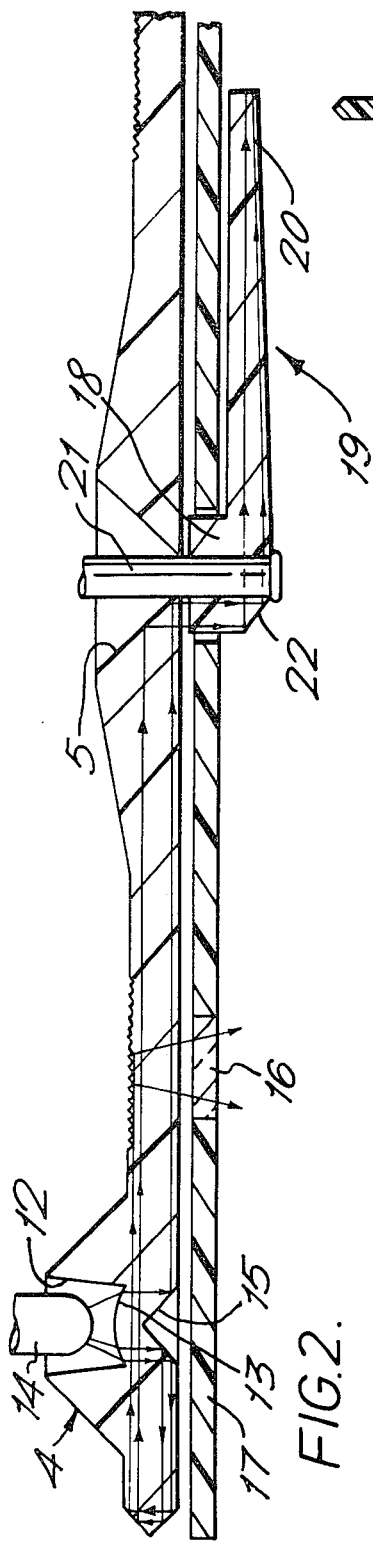
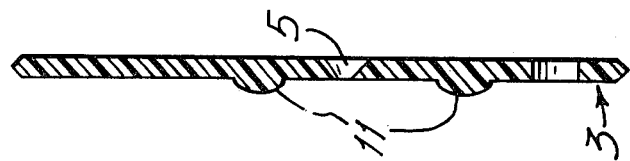
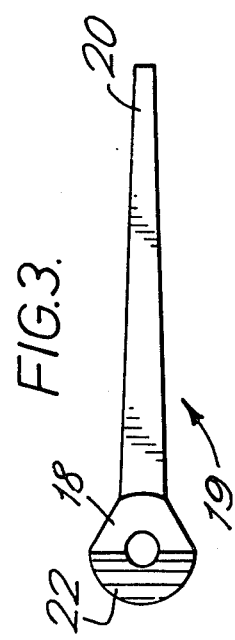

LAMINAR LIGHT GUIDE

BACKGROUND OF THE INVENTION

This invention relates to light guides, in particular but not exclusively to light guide illumination sources for illuminated vehicle instrument displays.

Instrument panel displays are known in which a light source or sources illuminate one side of a generally opaque panel marked with translucent characters or apertures through which light passes to reveal bright characters against the opaque background. Such a system makes inefficient use of the light since the entire reverse of the panel is illuminated and only a relatively small percentage of the light passes through the panel.

Alternative systems have been proposed in which a light guide conducts light from a source and directs it onto the front of a panel to reflectively illuminate fluorescent characters. Another light guide system has been devised in which the light guide passes behind a panel and the light is selectively directed by prismatic projections onto a convex reflector aligned with translucent characters in the panel which dispenses the light through the character. These light guide systems are inefficient at the light input stage which essentially consists of a plane surface abutting a lamp, and furthermore the co-operative parts, i.e. the lamp, reflectors and prismatic extensions require alignment.

SUMMARY OF THE INVENTION

The present invention contemplates an integral light guide into which at least one lamp may be inserted and the light from the guide is preferentially extracted at predetermined points.

Accordingly, the invention provides a light guide comprising a transparent lamina which is provided with at least one integrally formed light input socket for receiving a light source, the lamina having lens means and reflecting means associated with the socket for directing light into the plane of the lamina.

BRIEF DESCRIPTION OF THE FIGURES

An embodiment of the invention is now described by way of example with reference to the accompanying drawings in which:

FIG. 2 is a cross-sectional view along the line A—A of FIG. 1, also including an indicator instrument needle;

FIG. 3 is a plan view of the instrument needle shown in FIG. 2; and

FIG. 4 is a cross-sectional view through line B—B of FIG. 1 illustrating integral lenses.

DETAILED DESCRIPTION

Figure 1:
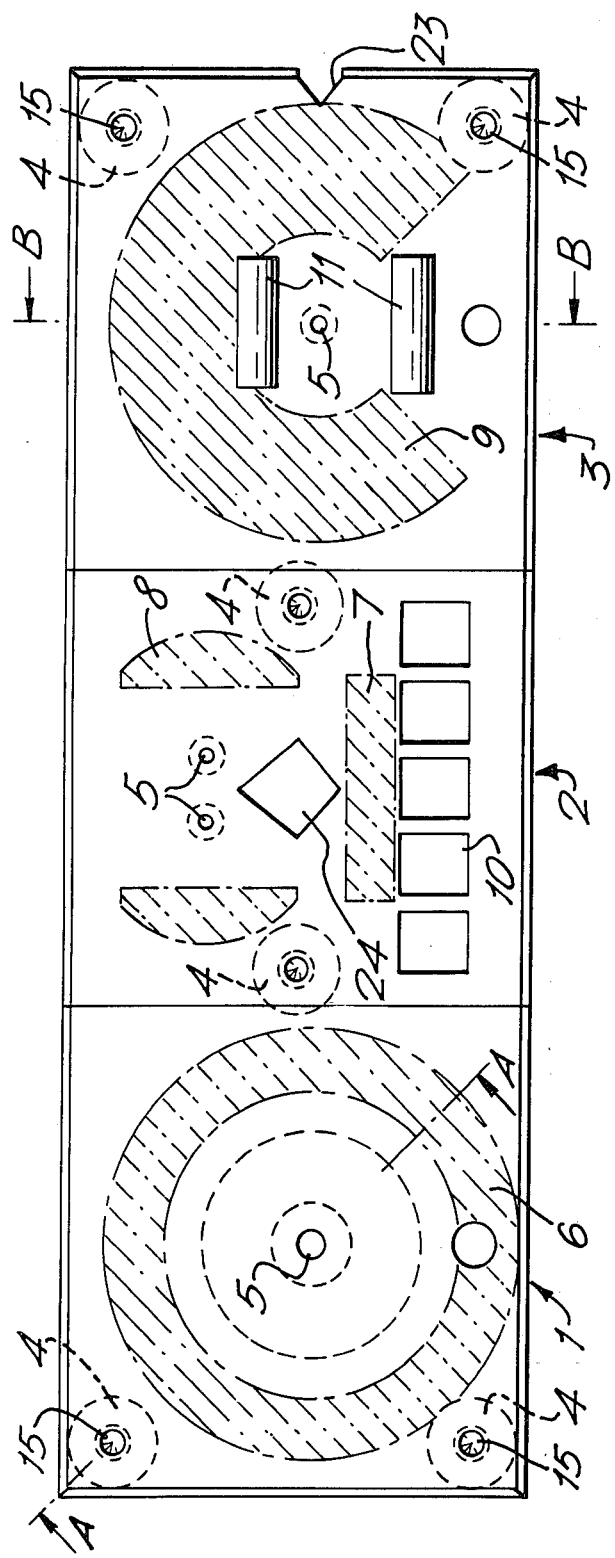
FIG. 1 illustrates a light guide suitable for use to illuminate a dashboard instrument panel.

FIG. 1 shows a laminar light guide, suitable for illuminating the dashboard instrument displays of an automobile, which consists of three units, a clock panel 1, a minor instrument panel 2, and a tachometer panel 3. Each panel consists of a molded transparent synthetic plastic lamina, the end panels 1 and 3 each having three bilaterally 45° chamfered edges and one plane edge which abuts a plane edge of the central minor instrument panel 2. The remaining two edges of the minor instrument panel 2 are also chamfered. Lamp sockets 4 are integrally molded with the laminas, in this embodiment two lamp sockets for each panel unit, into which 1.2 watt bulbs of about 5 mm diameter and 12 mm height can be inserted. These sockets are provided on the reverse of the panels 1, 2 and 3 as viewed in FIG. 1 and as ultimately mounted in the dashboard. Conical apertures 5 which are also integrally molded with the lamina are provided for the supporting pins of instrument needles. The apertures define truncated cones of 45° semi-vertical angle with the base of the cone, i.e. the larger radius, on the reverse of the panels.

Shaded areas 6, 7, 8 and 9 correspond to roughened surface regions on the reverse of the panels which serve to disperse light out of the laminas. When mounted on the dashboard these roughened areas are aligned with and serve to illuminate translucent, character defining areas of an otherwise opaque screen 17 overlying the light guide. The conical apertures 5 also serve to deflect light out of the laminas, in this case to illuminate indicator needles of the dashboard instruments. The function of the panels as a light guide and the optical paths are explained fully hereinafter with reference to FIG. 2. Apertures 10 are provided in the lamina for accommodating devices such as switches or warning lamps. Other areas 11 are provided for enabling reading of mechanical register displays such as mileometer and trip-meter displays behind the lamina and these areas may be simple apertures providing visual access to the registers or may be integrally lensed for enhancing the readability of the registers. A cross-sectional view through exemplary lenses 11 may be seen in FIG. 4. The opaque screen 17 will be provided with apertures and/or other display features corresponding to the positions of apertures 10 and lenses 11 and either the screen or the lenses may be masked to separate the characters of the mechanical register and conceal mechanisms such as interdigit rachets.

Each of the panels can be injection molded if they are designed, as in this embodiment, so as to avoid re-entrant shapes. The panels are preferably manufactured of acrylic plastics though they can be fabricated from any suitable optical quality transparent material including celluloid, nitrocellulose, perspex, acrylonitrile, polysulphones, polystyrene and polycarbonate.

FIG. 2 is a cross-sectional view diagonally across clock panel 1, as shown by arrows A—A in FIG. 1, illustrated for convenience with a lamp in the lamp socket. From this Figure it can be seen that each lamp socket 4 comprises a conical frustum with a central recess 12. The base of recess 12 is convex and forms a spherical lens 13 for incident light from a lamp 14 in the lamp socket 4. Aligned with and on the opposite (front) side of the lamina to the lamp socket 4 there is a 45° semi-vertical angle conical recess 15. Divergent light from lamp 14 is collimated by spherical lens 13 and the resultant parallel beam is then internally reflected by the surface of recess 15 into the plane of the lamina. After this reflection the light has a radial distribution about recess 15. The 45° chamfering of the outer edges of the panels insures that light incident on these edges does not emerge from the laminas, but is internally reflected back into the plane of the lamina.

As the light is transmitted within the lamina some of it encounters the roughened surface 6 and is scattered out of the plane of the lamina and through translucent characters 16 on opaque screen 17 disposed adjacent the front of the lamina. This produces diffuse illumination of the translucent characters, which may be colored, or the lamina or lamp colored, to give a colored display. Only the light travelling near the roughened surface and incident stray beams not parallel to the plane of the lamina is dispersed by surface 6, and a large proportion of the light continues to the conical aperture 5. At this aperture light is internally reflected and passes forwardly out of the lamina and into the shaft 18 of transparent clock hand 19 with pointer 20 which is supported on a pin 21 passing through aperture 5. The shaft 18 has a 45° bevelled facet 22 on the opposite half of the shaft to that which carries the pointer 20. Facet 22 provides a surface from which light transmitted out of the lamina by conical aperture 5 is internally reflected into the pointer 20. The half of the shaft which carries the pointer 20 is tapered towards the pointer, which itself has a tapering rectangular section.

Clock hand 19, which is illustrated in plan in FIG. 3, is preferably made of the same material as the lamina, and has a mat colored surface along the underside of the pointer. Alternatively the pointer may be colored or a color filter may be inserted in the light path between the lamina and the pointer. Pivot pin 21 is made as small as possible, and is preferably transparent.

The thickness of the lamina is progressively increased towards the aperture 5 which not only facilitates the mounting of more than one clock hand, although only one is shown for convenience, but also causes the projection of the walls of frustum aperture 5 on the plane of the lamina to be larger and so enables a greater hand boss diameter to be used thereby increasing the transfer of light into the clock hand.

Referring to FIG. 1, it can be seen that there is a notch 23 in the chamfered edge between the lamp sockets 4 of the tachometer panel 3. This notch 23 presents 45° surfaces from which light travelling in the direction from one corner socket 4 of panel 3 to the other is reflected towards the needle aperture 5. This notch 23 is particularly advantageous if rather than lenses 11 correspondingly position apertures are provided which thereby obstruct the passage of light directly from the lamp sockets 4 to the needle aperture 5. A diamond shaped aperture 24 is provided centrally of panel 2 for a similar purpose, namely to enhance the illumination of the features 5 by light from the edge sockets 4 of panel 2.

The panels may be secured by screws passing through holes (not shown) in the laminas, or the panels may be held in slotted recesses in a supporting frame.

I claim:
1. A light guide, comprising
   (a) at least one generally planar transparent lamina (1, 2, 3) including at least one integral light input socket (4) having an axis arranged generally normal to the plane of said lamina;
   (b) a light source (14) arranged within said socket; and
   (c) means for directing light from said light source into said planar lamina, including
      (1) first integral lens means (13) arranged adjacent said socket for focusing parallel beams of light into said lamina in a direction parallel to said socket axis; and
      (2) deflecting means (15) arranged in said lamina opposite said lens means for radially deflecting said parallel beams of light from said lens means in a direction normal to said socket axis, whereby light is distributed throughout said lamina.

2. Apparatus as defined in claim 1, wherein at least one edge of said lamina includes means for internally reflecting beams of light incident thereon, whereby radially deflected beams of light travelling within said planar lamina which strike said reflecting means are reflected back within said planar lamina.

3. Apparatus as defined in claim 2, wherein said lamina edge is bilaterally chamfered to define said reflecting means.

4. Apparatus as defined in claim 1, wherein said lamina further includes second integral lens areas (11).

5. Apparatus as defined in claim 1, wherein said lamina includes means for extracting light from said lamina.

6. Apparatus as defined in claim 5, wherein said light extracting means comprises a roughened area on one surface of said lamina for diffusely reflecting light incident thereon out of said lamina.

7. Apparatus as defined in claim 5, wherein said lamina includes at least one aperture (5) defined by a reflective surface comprising said light extracting means, whereby light beams travelling within said lamina which are incident on said surface are reflected out of said lamina in a direction parallel to said socket axis.

8. An instrument display, comprising
   (a) a light guide, including
      (1) at least one generally planar transparent lamina (1, 2, 3) including at least one integral light input socket (4) having an axis arranged generally normal to the plane of said lamina;
      (2) a light source (14) arranged within said socket;
      (3) means for directing light from said light source into said lamina, including
         (a) first integral lens means (13) arranged adjacent said socket for focusing parallel beams of light into said lamina in a direction parallel to said socket axis; and
         (b) means (15) arranged in said lamina opposite said lens means for radially deflecting said parallel beams of light from said lens means in a direction normal to said socket axis, whereby light is distributed throughout said lamina; and
      (4) means for extracting light from said lamina; and
   (b) an instrument panel comprising an opaque screen (17) arranged adjacent and parallel to said light guide, said screen having translucent characters (16) arranged opposite said light extracting means, whereby light from said light guide illuminates said characters.

9. Apparatus as defined in claim 8, and further comprising an additional light guide connected with said extracting means, said additional light guide comprising a pointer (20) for an instrument.

* * * * *